United States Patent
Jönsson et al.

(10) Patent No.: US 6,883,331 B2
(45) Date of Patent: Apr. 26, 2005

(54) METHOD AND ARRANGEMENT FOR PROVIDING A GAS TURBINE, AND ENGINE-BRAKING THEREFORE

(75) Inventors: Bertil Jönsson, Bjarred (SE); Lars Sundin, Malmo (SE)

(73) Assignee: Volvo Aero Corporation, Trollhattan (SE)

( * ) Notice: Subject to any disclaimer, the term of this patent is extended or adjusted under 35 U.S.C. 154(b) by 0 days.

(21) Appl. No.: 10/605,531

(22) Filed: Oct. 6, 2003

(65) Prior Publication Data

US 2004/0103666 A1 Jun. 3, 2004

Related U.S. Application Data

(63) Continuation of application No. PCT/SE02/00666, filed on Apr. 4, 2002, now abandoned.

(30) Foreign Application Priority Data

Apr. 6, 2001 (SE) .............................................. 0101266

(51) Int. Cl.[7] .............................................. F02C 6/08
(52) U.S. Cl. ........................................ 60/773; 60/39.23
(58) Field of Search ....................... 60/773, 785, 39.23, 60/795

(56) References Cited

U.S. PATENT DOCUMENTS

| | | | |
|---|---|---|---|
| 3,710,576 A | | 1/1973 | Evans et al. |
| 3,893,292 A | | 7/1975 | Amann et al. |
| 3,915,587 A | * | 10/1975 | Rannenberg ................. 415/27 |
| 5,477,673 A | * | 12/1995 | Blais et al. .................... 60/785 |
| 6,122,905 A | * | 9/2000 | Liu ............................. 60/785 |

FOREIGN PATENT DOCUMENTS

FR 2734318 A1 11/1996

* cited by examiner

Primary Examiner—Ehud Gartenberg
(74) Attorney, Agent, or Firm—Novak Druce & Quigg, LLP

(57) ABSTRACT

Method and arrangement for providing a gas turbine (1) having a first compressor (2), a combustion chamber (16) and a first turbine (11), the turbine being adapted to drive the compressor via a first shaft (10a, 10b). The gas turbine also has a bleed valve (12) arranged upstream of the first turbine for conducting part of a gas compressed by the compressor past it during engine braking. The invention also relates to a method for engine-braking a gas turbine.

25 Claims, 4 Drawing Sheets

METHOD AND ARRANGEMENT FOR PROVIDING A GAS TURBINE, AND ENGINE-BRAKING THEREFORE

CROSS REFERENCE TO RELATED APPLICATIONS

This present application is a continuation patent application of International Application No. PCT/SE02/00666 filed 4 Apr. 2002 which was published in English pursuant to Article 21(2) of the Patent Cooperation Treaty, and which claims priority to Swedish Application No. 0101266-5 filed 6 Apr. 2001. Both applications are expressly incorporated herein by reference in their entireties.

BACKGROUND OF INVENTION

1. Field of the Invention

The present invention relates to a gas turbine having a first compressor, a combustion chamber and a first turbine, The turbine is adapted to drive the compressor via a first shaft. The gas turbine is adapted for compression of the gas in the compressor, heating of the compressed gas in the combustion chamber and expansion of the heated gas in the turbine. The invention also relates to a method for engine-braking such a gas turbine.

2. Background

Gas turbines are used as, for example, engines for vehicles and aircraft, and as power plants in vessels, and in power stations for electricity production.

The gas turbine will be described below in a case in which it includes a free power turbine. This is a preferred, but in no way limiting application of the invention. The arrangement of the compressor, the turbine for driving the compressor via the first shaft, and the combustion chamber is usually referred to as a gas generator. The power turbine connected to a drive shaft is arranged downstream of the first turbine and is adapted to be driven by the gas from the first turbine. In other words, the gas generator and the power turbine are connected only by the expanded hot gases.

The gas turbine is preferably of the recuperative or regenerative type; that is to say, it includes a heat exchanger which is adapted to recover energy from the hot exhaust gases.

With their great power in relation to their weight, gas turbines are very suitable for the propulsion of vehicles, and this applies in particular to gas turbines with two shafts, one of which connects the free power turbine, via a vehicle transmission, to a driving shaft of the vehicle. One problem in vehicle applications is bringing about an engine-braking function. This applies in particular in the case of heavy-duty vehicles such as trucks. The present invention will be described below in a setting and situation in which it is applied in a vehicle for the propulsion thereof. This is a preferred, but in no way limiting application of the invention.

In gas turbines with a compressor driven by a turbine and a combustion chamber arranged therebetween, it is known to reduce, or shut off completely, the fuel supply to the combustion chamber for the purpose of reducing/braking the speed of the engine. In one respect, this method for speed reduction/engine-braking is relatively slow due to the fact that internal friction in gas turbines is very low and in another respect because of the fact that a relatively large part of the work performed in compression, in the compressor, is recovered when the subsequent expansion in the turbine takes place.

SUMMARY OF INVENTION

A first object of the present invention is to provide an engine-braking system for a gas turbine engine that affords opportunities for rapidly reducing the speed of the engine, and which is fuel-efficient. In at least one regard, the object is achieved by virtue of the fact that the gas turbine comprises a bleed valve arranged upstream of the first turbine for conducting part of the gas compressed by the compressor past the turbine during engine braking. The arrangement of a bleed valve downstream of the compressor and upstream of the turbine makes it possible to regulate the gas flow through the turbine to a relatively low level thereby affecting engine-braking. This in turn results in the driving power for the first compressor being considerably reduced and the gas turbine is braked.

According to a preferred embodiment of the invention, the bleed valve is adapted in such a way that its opening area for regulating the quantity of gas which is intended to be conducted past the first turbine is controlled depending on the pressure in the gas from the compressor. This construction affords opportunities for engine-braking in a simple manner in terms of construction and/or control. By virtue of automatic control of the bleed valve, no external regulation of the bleed valve, for example, is required.

According to another preferred embodiment of the invention, the bleed valve comprises (includes, but is not limited to) a spring-loaded opening means for regulating the opening area. This is a simple solution in terms of construction. It is moreover possible, by selecting a suitable spring force for the spring, to determine the opening characteristic.

According to another preferred embodiment of the invention, the bleed valve is arranged upstream of the combustion chamber. This affords opportunities for controlling the gas supply and fuel supply to the combustion chamber in an optimum manner during engine-braking. Preferably, the fuel flow to the combustion chamber is reduced and only a sufficiently large part of the gas compressed by the compressor is conducted to the combustion chamber in order to maintain such a flame in the combustion chamber that the temperature of the parts which are hot during operation of the gas turbine is kept above a predetermined temperature. In this way, cooling of the combustion chamber is reduced and an opportunity is afforded for maintaining a desired idling temperature of the turbine.

According to a development of the preceding embodiment, the gas turbine comprises a heat exchanger arranged between the compressor and the combustion chamber. The conducting-off described above of the gas past the combustion chamber is especially advantageous in this case as otherwise a great air flow would cool the heat exchanger which leads to the lifetime of the heat exchanger being shortened owing to thermal fatigue and also to increased fuel consumption because the heat exchanger has to be heated up again when the engine speed is increased again. By virtue of this arrangement, cooling of the heat exchanger is therefore reduced. This also results in the lifetime of the heat exchanger being lengthened as it is subjected to less thermal fatigue, and also the overall efficiency of the gas turbine increasing as great temperature variations of the heat exchanger can be avoided/reduced.

According to another preferred embodiment of the invention, the gas turbine comprises a power turbine adapted to drive a second shaft, which power turbine is arranged downstream of the first turbine and is adapted to be driven by the gas from it. By expanding the gas in two stages, first in the turbine and then in the power turbine, the pressure drop across each turbine is reduced. Furthermore, an opportunity is afforded for optimizing the power turbine with regard to a desired torque characteristic; for example, in the case of propulsion of vehicles.

The gas turbine preferably also comprises a transmission for selectively coupling together the second shaft and the first shaft, and/or means for variable regulation of the flow to the power turbine. In this way, the engine-braking operation can be controlled and varied to a greater extent. By virtue of, by means of the bleed valve, diverting part of the gas flow which has been compressed in the compressor past the turbine and power turbine, these contribute neither to driving the compressor nor to propulsion of the vehicle. When engine-braking takes place, the driving of the compressor is effected by virtue of the motive energy of the vehicle being converted and transmitted via the transmission to the shaft for driving the compressor.

According to another preferred embodiment of the invention, the gas turbine comprises a second compressor arranged in series with and downstream of said first compressor, and the bleed valve is arranged upstream of the second compressor. In this way, all or part of the gas flow from the first compressor can be conducted past the second compressor in connection with engine-braking. This in turn leads to the work performed in pressure build-up in the first compressor resulting in braking of the gas turbine.

A second object of the invention is to provide a method for engine-braking a gas turbine that affords opportunities for rapidly reducing the speed of the engine. The invention also aims to provide a method which results in a gas turbine which is efficient with regard to fuel consumption.

This object is achieved by a method for engine-braking a gas turbine comprising a first compressor, a combustion chamber and a first turbine. The turbine is adapted to drive the compressor, via a first shaft, and part of the gas compressed by the compressor is conducted past the first turbine during engine-braking. The heat losses which arise as a result of cooling of the hot parts of the engine can thus be reduced. By virtue of the fact that part of the air compressed by the compressor is conducted past the turbine at the same time as the fuel supply to the combustion chamber is reduced to a flow which is smaller than the normal idling flow, what is known as the pilot flow, cooling of the hot parts of the engine can be reduced further.

Other advantageous embodiments and advantages of the invention emerge from the detailed description below.

BRIEF DESCRIPTION OF DRAWINGS

The invention will be described below with reference to preferred embodiments and the accompanying drawings, in which.

DETAILED DESCRIPTION

Figure 1:
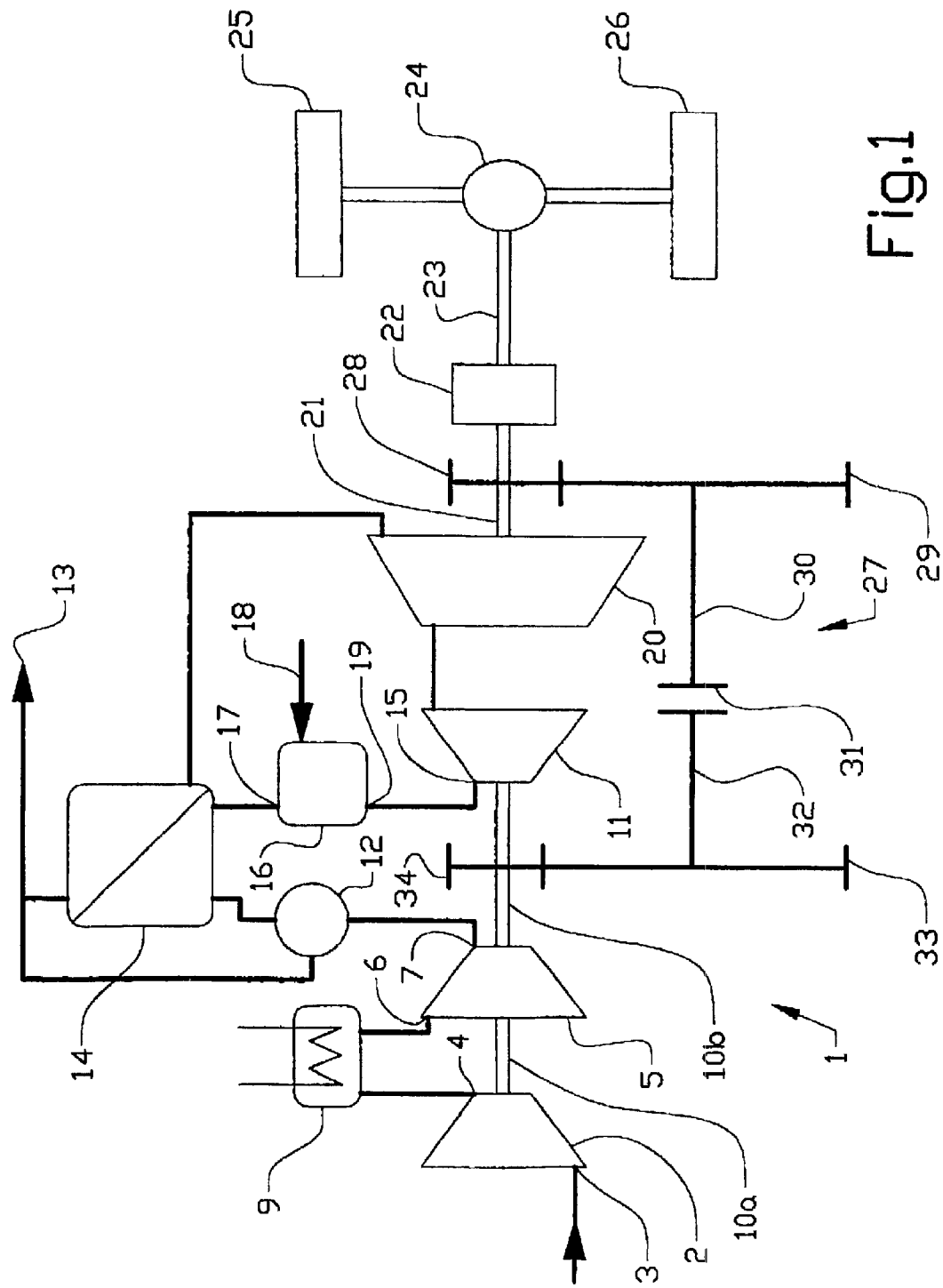
FIG. 1 is a diagrammatic view showing a gas turbine configured according to the teachings of a first embodiment of the present invention.

FIG. 1 shows diagrammatically a twin-shaft gas turbine 1 configured according to a first embodiment of the presently disclosed invention. The gas turbine 1 comprises a first compressor 2 with a compressor inlet 3 and a compressor outlet 4, and a second compressor 5 with a second compressor inlet 6 and a second compressor outlet 7. The compressor inlet 3 is open to the atmosphere via an air filter (not shown). Arranged between the compressor outlet 4 of the first compressor 2 and the compressor inlet 6 of the second compressor 5 is an intercooler 9, the function of which is to cool the air compressed by the first compressor 2 before a further pressure increase takes place in the second compressor 5. The intercooler 9 is coupled to a separate cooling system (not shown).

Each compressor 2, 5 also comprises an impeller connected in a rotationally fixed manner to one another, via a shaft 10a, 10b, and to a turbine wheel arranged in a turbine 11.

Arranged downstream of the compressor outlet 7 of the second compressor 5 is a bleed valve 12 adapted so as, depending on operating conditions, to guide the compressed air to an exhaust-gas outlet 13 in connection with engine-braking or to a heat exchanger 14 for recovery of exhaust-gas heat in connection with operation. The arrangement of the bleed valve 12 downstream of the second compressor outlet 7 and upstream of the turbine inlet 15 of the turbine 11 makes it possible to regulate the gas flow through the turbine 11 to a desired relatively low level in connection with engine-braking. This in turn results in the driving power for the compressors 2, 5 from the turbine 11 being considerably reduced, the gas turbine 1 thus being braked.

The compressed air is then conducted to a combustion chamber 16, via the gas inlet 17 thereof, fuel 18 being supplied to the chamber by means of a fuel system (not shown) and being combusted therein with the aid of the hot compressed air. The hot combustion gases are conducted, via the gas outlet 19 of the combustion chamber 16, to the turbine 11, where a first, limited expansion of the combustion gases takes place for driving the compressors 2, 5. The final expansion, down to close to atmospheric pressure, takes place in a power turbine 20 arranged downstream of said turbine 11. By virtue of finally conducting the combustion gases from the power turbine 20 through the heat exchanger 14, energy can be recovered, before the gases are conducted to the exhaust-gas outlet 13, which contributes to increased overall efficiency of the gas turbine 1.

The gas conducted off via the bleed valve 12 is therefore not conducted to the power turbine 20, but directly to the atmosphere; or alternatively, via a heat exchanger to the atmosphere.

In this connection, an output shaft 21 from the power turbine 20 is, via a transmission 22, connected to a driving shaft 23 of the vehicle the the gas turbine 1 is to propel. The driving shaft 23 is in turn coupled to a differential 24 which distributes the driving torque to the driving wheels 25, 26 of the vehicle.

By virtue of the fact that a transmission 27 is arranged between the driving shaft 23 of the vehicle, via the output shaft 21 of the power turbine, and said shaft 10a, 10b, the motive energy of the vehicle can, in connection with engine-braking, be used for driving the compressors 2, 5, which provides effective braking of both the gas turbine 1 and the vehicle. The transmission 27 comprises a first gearwheel 28 arranged in a rotationally fixed manner on the output shaft 21 of the power turbine and in engagement with a second gearwheel 29 arranged in a rotationally fixed manner on a first intermediate shaft 30. The first intermediate shaft 30 can, by means of a controllable clutch 31, preferably a friction clutch, be selectively coupled together with a second intermediate shaft 32, on which a third gearwheel 33 is arranged, which is in engagement with a fourth gearwheel 34 arranged in a rotationally fixed manner on the shaft 10*b*.

Owing to the bleed valve 12, it is possible during engine-braking to guide a smaller part of the compressed air through the gas duct and the combustion chamber 16 and to combust a small quantity of fuel in the combustion chamber in order to prevent extinction of the combustion chamber and to keep the temperature of the gas duct sufficiently high to minimize thermal stresses. It is also desirable to maintain such a flame in the combustion chamber that great cooling of hot parts of the gas turbine is counteracted. In other words, the temperature of these hot parts is kept above a predetermined value. In this context, the terminology of "hot parts" should be understood to mean, among other things, the combustion chamber, the heat exchanger and the gas duct. It is thus sought to counteract great cooling of the hot parts of the gas turbine. In this connection, the majority of the gas is conducted past the combustion chamber. The quantity of fuel introduced is such as will keep the turbine inlet temperature essentially constant above a specific value.

Figure 2:
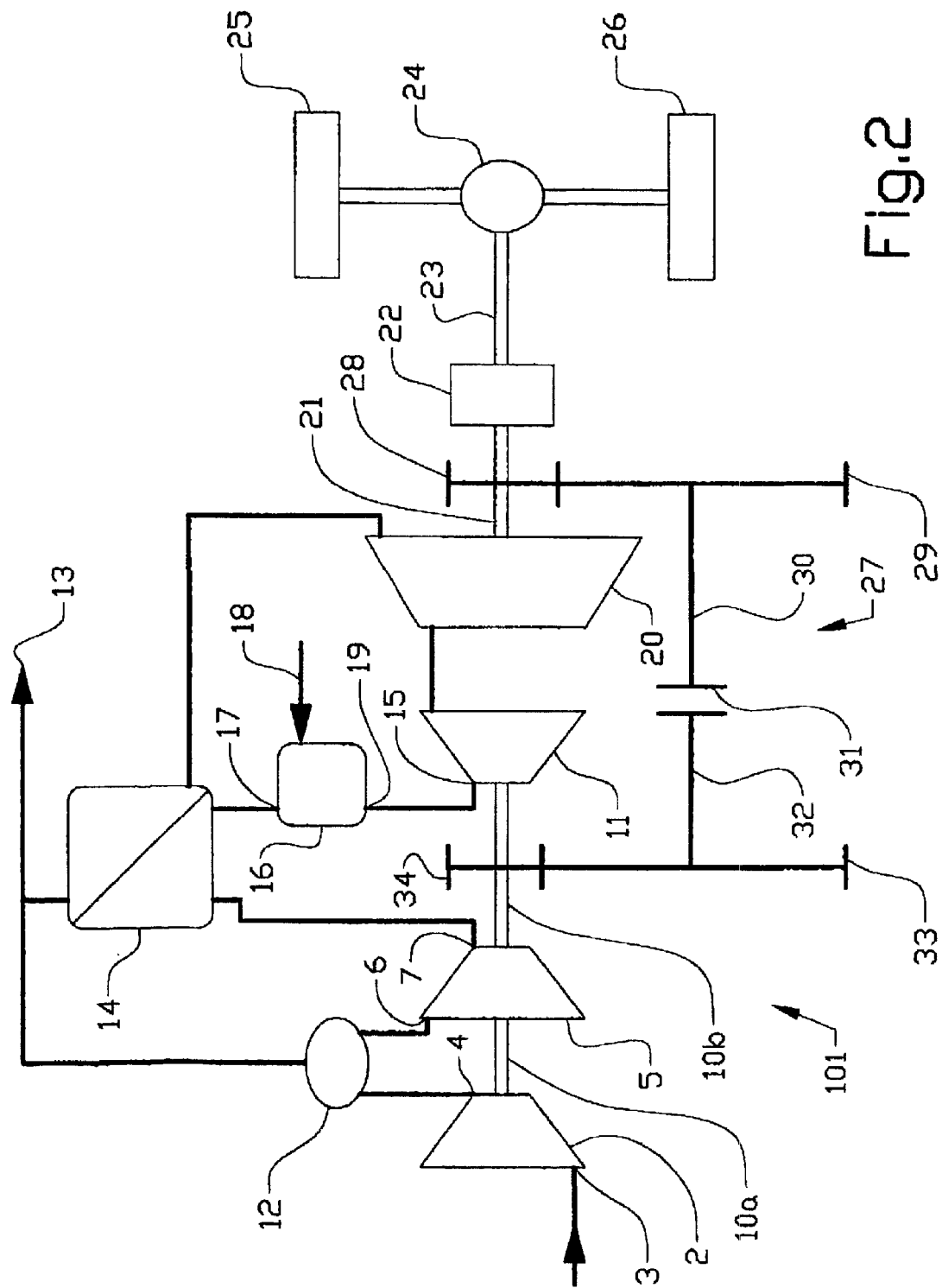
FIG. 2 is a diagrammatic view showing a gas turbine configured according to a second embodiment of the invention.

With reference to FIG. 2, a second embodiment of a gas turbine 1 is described, in which the bleed valve 12, in contrast to the description above, is arranged downstream of the compressor outlet 4 of the first compressor 2 and upstream of the compressor inlet 6 of the second compressor 5. In this way, all or part of the gas flow from the first compressor 2 can be conducted past the second compressor 5 in connection with engine-braking. This in turn leads to the work performed in pressure build-up in the first compressor 2 resulting in braking of the gas turbine 1.

Figure 3:
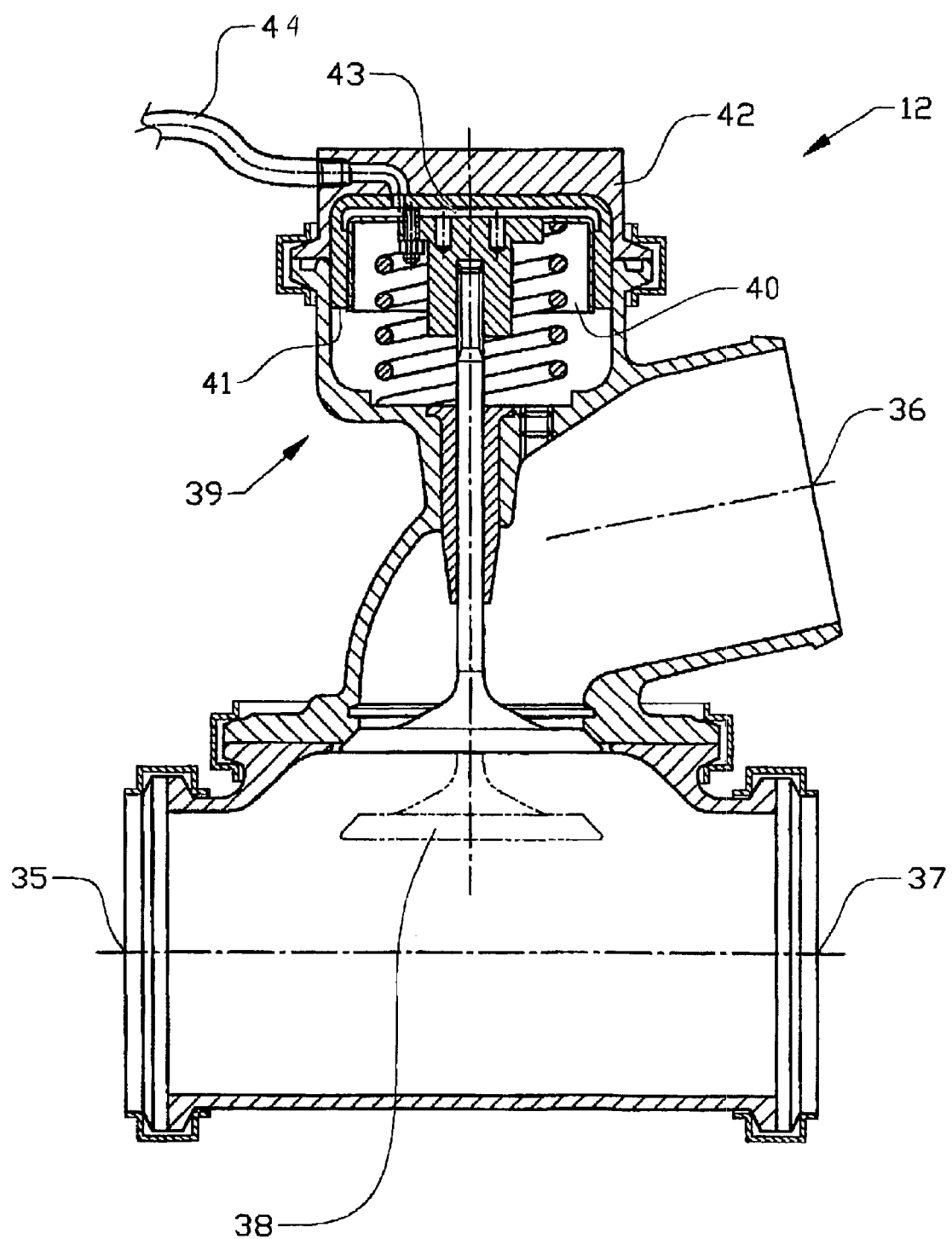
FIG. 3 is a side view, taken in cross section, of a bleed valve for a gas turbine.

FIG. 3 shows a side view, in cross section, of a bleed valve 12 intended to be used in an engine-braking system for a gas turbine 1. The bleed valve 12 comprises a valve inlet 35, intended to be connected to a compressor outlet 4, 7, a first valve outlet 36 intended to be connected to the exhaust-gas outlet 13, and a second valve outlet 37 intended to be connected to the heat exchanger 14 or, depending on the embodiment, to the compressor inlet 6 of the second compressor 5. The bleed valve 12 also comprises an opening means in the form of a disk valve 38, the reciprocating movement of which is controlled by a pneumatic pressure cell 39. The pressure cell 39 comprises a piston 40, sealed by a diaphragm 41, which, together with a pressure cover 42, forms a closed space 43, to which a pressure line 44 is coupled. The pressure line 44 is in turn, via a solenoid valve (not shown), connected to the compressor outlet 7. By virtue of the fact that the piston 40 is adapted so as to move counter to the action of a helical spring 45, it is possible, by spring characteristic selection, for the desired working pressure to be maintained in the line to the components downstream of the bleed valve, that is to say the valve outlet 37. The quantity of gas which is conducted past the combustion chamber is controlled depending on the pressure in the gas from the compressor, that is to say automatic regulation takes place. The gas compressed by the compressor which is conducted past the combustion chamber is in this case conducted directly into the atmosphere.

Figure 4:
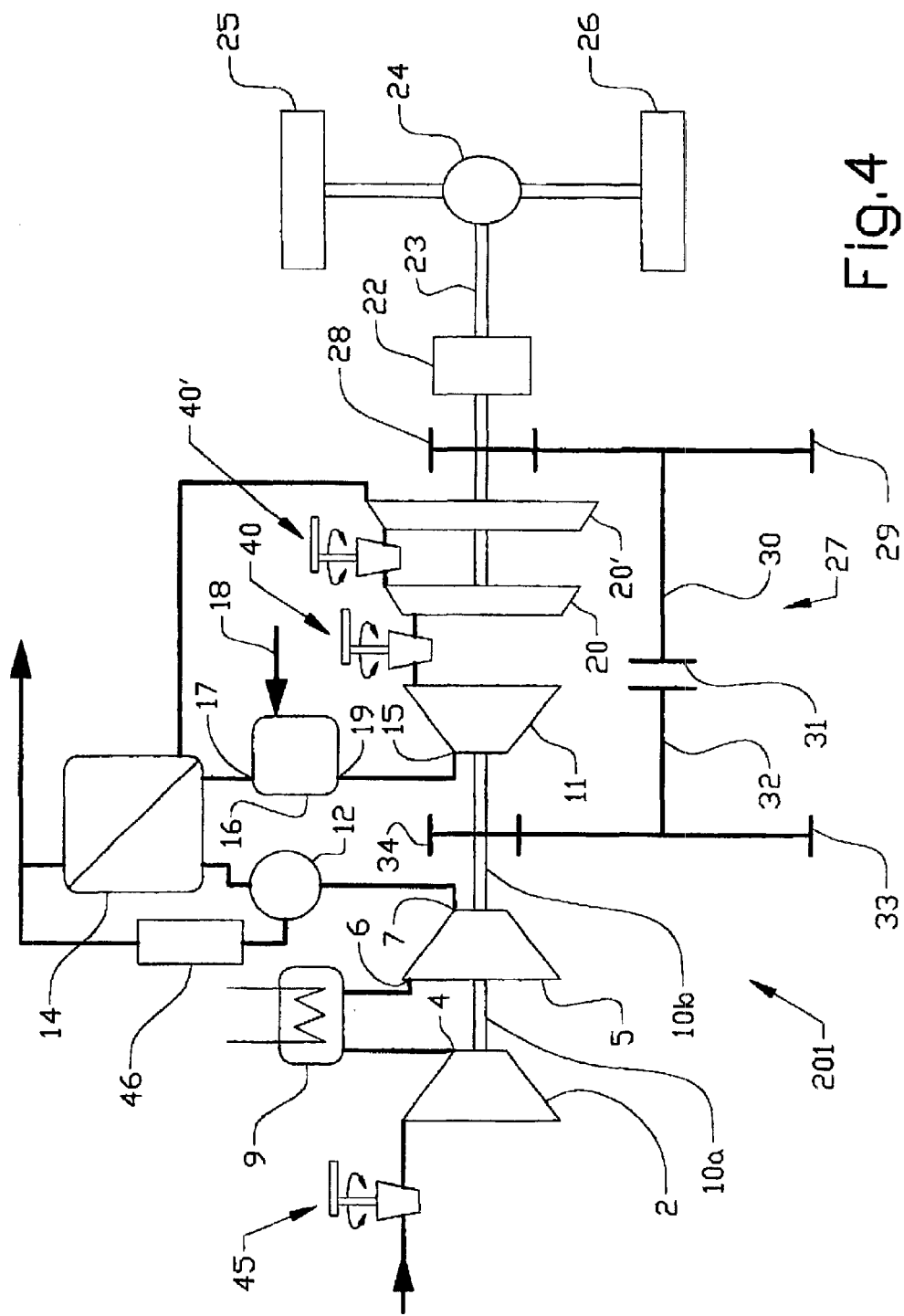
FIG. 4 is a diagrammatic view showing a gas turbine configured according to a third embodiment of the invention.

FIG. 4 diagrammatically illustrates a fourth preferred embodiment of the invention. This differs from the first embodiment in a few respects. The gas turbine 1 comprises means 45 for variable regulation of the flow to the compressor 2 for regulation of the braking effect. Here, this means 45 consists of variable inlet guide vanes. The guide vanes are arranged in order to alter the angle of the flow in order to alter the pressure build-up in the compressor.

Two driving turbines 20, 20" are also arranged on the driving shaft 23. Each of these is equipped with means 40, 40" for variable regulation of the flow to the power turbine 20, 20". These means consist of a variable stator, or guide vanes. The guide vanes are adapted so as to regulate the gas quantity to the power turbine and in this way control the turbine inlet temperature.

A silencer 46 is also arranged after the bleed valve on the line which leads to the atmosphere.

A preferred example of a method for engine-braking the gas turbine illustrated in FIG. 4 is hereinafter described. In normal operation, that is to say when the gas turbine drives the vehicle, each of the rotatable stators 40, 40" of the driving turbines 20, 20" is arranged in a driving position, the bleed valve 12 is closed, the clutch 31 between the gas generator and the driving turbine is disengaged and the inlet guide vanes 45 of the compressor 2 are in an open position, that is to say close to 0 degrees. In other words, the compressor is not throttled, but is delivering maximum mass flow for the speed concerned. The gas generator rotates at a speed between idling and maximum power, and the speed of the driving turbine is determined by the speed of the driving wheels and the gear concerned.

When the opening of the throttle is reduced, the following happens: the fuel flow to the combustion chamber 16 decreases. The speed of the gas generator drops, the power decreases, the vehicle slows down, but the power still goes from the engine to the driving wheels 25, 26. The angle of the guide vanes 45 of the compressor 2 is adjusted to a more closed position, which means that the mass flow decreases. Alternatively or supplementarily, an operating parameter other than the opening of the throttle can be detected for initiating engine-braking. In this case, the opening of the throttle is controlled by a throttle control, such as a throttle pedal, which in turn controls the speed of the gas generator and thus the quantity of air supplied to the engine.

When the opening of the throttle is reduced further to the idling state, the following happens: the fuel flow decreases to idling flow, which means fuel is supplied only to the pilot nozzle of the combustion chamber 16. The guide vanes 40, 40" of the driving turbine 20, 20" are angled to braking position, and the driving turbine is braked. Power then goes from the driving wheels 25, 26 to the engine (engine brake).

"Active" engine-braking is initiated by actuating a brake control, in the form of a brake pedal or another type of brake control, such as a hand control. The stator 40 of the driving turbine 20 is arranged in a braking position, and the driving turbine 20 is then coupled to the gas generator by virtue of the disk clutch 31 being activated. Preferably, the clutch is slipped in briefly in order to synchronize the speed of the shafts 10*b*, 23 and is subsequently locked with full pressure. The bleed valve 12 is then opened. The fuel flow to the combustion chamber is adjusted to the small air quantity which passes through the combustion chamber and the gas duct so that a suitable temperature is maintained and so that great cooling of the hot parts is avoided. The guide vanes 45 of the compressor 2 are in a closed position, that is to say the mass flow of the compressor is the smallest possible at the speed concerned, which provides the smallest braking effect in engine-braking with compressor bleeding.

Maximum engine braking is then achieved by the guide vanes 45 of the compressor 2 being opened to the fully open position.

The engine-braking effect can of course be varied by varying the positions of driving turbine guide vanes and compressor guide vanes.

The invention is not to be regarded as being limited to the embodiments described above, but a number of modifications thereof are possible without for this reason leaving the scope of the patent protection. For example, the number of both compressor stages and turbine stages can be varied both upwardly and downwardly. Furthermore, an electrically or hydraulically controlled bleed valve can be used instead of the pneumatically controlled bleed valve described above.

According to an alternative to the embodiments described above, a number of bleed valves can be used. In a case where there are two compressors, a first bleed valve can be arranged after the compressors according to the first embodiment above, and a second bleed valve can be arranged between the compressors according to the second embodiment above. The second bleed valve can be used to control the braking effect alternatively or supplementarily to said guide vanes.

Furthermore, for example, only one of the driving turbines, suitably the first, in the driving turbine part, can have a variable stator. This reduces the complexity and is cost-effective.

It is also within the scope of the patent protection, for example, for the gas turbine to be of the single-shaft type, that is to say the turbine connected to the compressor is adapted so as also to constitute a driving turbine for propulsion of a vehicle.

What is claimed is:

1. A land-vehicle gas turbine (1, 101, 201) comprising:
   a combustion chamber (16);
   a first turbine (11) located upstream of a first compressor (2) relative to said gas turbine, said turbine (11) being adapted to drive the compressor (2) via a first shaft (10a, 10b); and
   a bleed valve (12) arranged upstream of the first turbine and which conducts part of a gas compressed by the compressor past the turbine during engine-braking, said bleed valve (12) having an opening area configured to regulate the quantity of gas conducted past the first turbine (11) and which is actuated by the pressure of the gas exciting the compressor (2).

2. The gas turbine as recited in claim 1, wherein the bleed valve (12) comprises a spring-loaded opening means (38) for regulating said opening area.

3. The gas turbine as recited in claim 1, wherein the bleed valve (12) is arranged upstream of the combustion chamber (16).

4. The gas turbine as recited in claim 1, wherein the gas turbine comprises a power turbine (20) adapted to drive a second shaft (21), which power turbine is arranged downstream of the first turbine (11) and is adapted to be driven by the gas from it.

5. The gas turbine as recited in claim 4, wherein the gas turbine comprises a transmission (27) for selective coupling together of said second shaft (21) and said first shaft (10a, 10b).

6. The gas turbine as recited in claim 5, wherein the transmission (27) comprises a clutch (31) for said selective coupling together of the driving shaft (23) and the shaft (10a, 10b).

7. The gas turbine as recited in claim 1, wherein the gas turbine comprises means (40) for variable regulation of the flow to the power turbine (20).

8. The gas turbine as recited in claim 1, wherein the gas turbine comprises a heat exchanger (14) arranged between the compressor (2) and the combustion chamber (16).

9. The gas turbine as recited in claim 8, wherein the bleed valve (12) is arranged upstream of the heat exchanger (14).

10. The gas turbine as recited in claim 1, wherein the gas turbine comprises a second compressor (5) arranged downstream of said first compressor (2), and in that the bleed valve (12) is arranged upstream of the second compressor (5).

11. The gas turbine as recited in claim 1, wherein the gas turbine comprises means (45) for variable regulation of the flow to the compressor (2) for regulation of the braking effect.

12. A method for engine-braking a land-vehicle gas turbine (1, 101, 201) comprising a first compressor (2), a combustion chamber (16) and a first turbine (11), the turbine being adapted to drive the compressor via a first shaft (10a, 10b), wherein part of the gas compressed by the compressor (2) is conducted past the first turbine (11) utilizing a bleed valve (12) arranged upstream of said first turbine (11) relative to the gas turbine during engine-braking, and wherein the quantity of gas conducted past the first turbine (11) being actuated by the pressure in the gas from the compressor (2).

13. The method as recited in claim 12, wherein the opening area of a bleed valve (12) adapted for said conducting-off of the gas past the first turbine (11) is controlled directly by said pressure in the gas from the compressor.

14. The method as recited in claim 13, wherein the opening area is regulated by an opening means (38) which is arranged in the bleed valve (12) and is adapted to be moved counter to a predetermined spring force.

15. The method as recited in claim 12, wherein the part of the compressed gas is conducted past the combustion chamber (16).

16. The method as recited in claim 12, wherein the gas turbine comprises a power turbine (20) adapted to drive a second shaft (21), which power turbine is arranged downstream of the first turbine (11) and is adapted to be driven by the gas from the first turbine.

17. The method as recited in claim 12, wherein the driving shaft (21) is coupled together, into driving connection, with the first shaft (10a, 10b) for engine-braking.

18. The method as recited in claim 12, wherein the fuel flow to the combustion chamber (16) is reduced, and in that a sufficiently large part of the gas compressed by the compressor (2) is conducted to the combustion chamber in order to maintain such a flame in the combustion chamber that the temperature of the parts which are hot during operation of the gas turbine is kept above a predetermined temperature.

19. The method as recited in claim 18, wherein the coupling together of the shafts (10a, 10b, 21) takes place after detected actuation of a brake control.

20. The method as recited in claim 12, wherein the guide vanes are adapted for regulation of the gas quantity to the power turbine are adjusted into a braking position, the power turbine thus being braked.

21. The method as recited in claim 20, wherein said adjustment of the guide vanes is carried out after a detected reduction in the opening of the throttle.

22. The method as recited in claim 12, wherein the gas compressed by the compressor which is conducted past the first turbine (11) is conducted directly into the atmosphere.

23. The method as recited in claim 12, wherein the gas turbine comprises a heat exchanger arranged downstream of the compressor and upstream of the combustion chamber.

24. The method as recited in claim 23, wherein said part of the compressed gas is conducted past the heat exchanger.

25. A vehicle comprising a land-vehicle gas turbine for providing propulsion to the vehicle, said gas turbine comprising:

a combustion chamber (16);

a first turbine (11) located upstream of a first compressor (2) relative to said gas turbine, said turbine (11) being adapted to drive the compressor (2) via a first shaft (10a, 10b); and a bleed valve (12) arranged upstream of the first turbine and which conducts part of a gas compressed by the compressor past the turbine during engine-braking, said bleed valve (12) having an opening area configured to regulate the quantity of gas conducted past the first turbine (11) and which is actuated by the pressure of the gas exiting the compressor (2).

* * * * *